(12) United States Patent
Spitaels et al.

(10) Patent No.: US 6,775,715 B2
(45) Date of Patent: Aug. 10, 2004

(54) MULTIPURPOSE DATA PORT

(75) Inventors: James S. Spitaels, Worcester, MA (US); Joseph Dechene, Nashua, NH (US)

(73) Assignee: American Power Conversion, West Kingston, RI (US)

( * ) Notice: Subject to any disclaimer, the term of this patent is extended or adjusted under 35 U.S.C. 154(b) by 0 days.

(21) Appl. No.: 10/234,031

(22) Filed: Sep. 3, 2002

(65) Prior Publication Data

US 2003/0075985 A1 Apr. 24, 2003

Related U.S. Application Data

(63) Continuation of application No. 09/813,405, filed on Mar. 20, 2001, now Pat. No. 6,445,088.

(51) Int. Cl.[7] .............................................. G06F 13/00
(52) U.S. Cl. ........................................................ 710/8
(58) Field of Search ............................... 710/8, 11, 100, 710/105, 305, 313, 315; 363/95, 97, 131; 307/45, 46, 64, 66, 72–75

(56) References Cited

U.S. PATENT DOCUMENTS

| 4,860,185 | A | * | 8/1989 | Brewer et al. ................. 363/41 |
| 5,184,025 | A | * | 2/1993 | McCurry et al. .............. 307/66 |
| 5,859,993 | A | * | 1/1999 | Snyder ........................ 712/208 |
| 5,982,652 | A | * | 11/1999 | Simonelli et al. ........... 363/142 |
| 6,121,695 | A | * | 9/2000 | Loh ............................. 307/64 |
| 6,260,084 | B1 | * | 7/2001 | Wilson et al. ................ 710/38 |
| 6,415,342 | B1 | * | 7/2002 | Wahl et al. .................. 710/100 |
| 6,542,946 | B1 | * | 4/2003 | Wooten ....................... 710/106 |

* cited by examiner

Primary Examiner—Matthew V. Nguyen
(74) Attorney, Agent, or Firm—Mintz, Levin, Cohn, Ferris, Glovsky and Popeo, P.C.

(57) ABSTRACT

An uninterruptible power supply includes a multipurpose data port that facilitates a plurality of communication methods including USB, serial and other communication methods, between the uninterruptible power supply and a host computer system. The multipurpose data port is configured to prevent interference if a user mistakenly connects a phone line or other similar but inappropriate line to the uninterruptible power supply. The multipurpose data port reduces the machine footprint needed to support multiple communication ports.

15 Claims, 4 Drawing Sheets

| 10 Position RJ-45 Jack Connector Pinout | USB Cable Cable USB Series A Plug | Simple Signaling Cable DB-9 Female Connector | Smart Cable DB-9 Female Connector |
|---|---|---|---|
| 1. USB VCC | USB pin 1 (red) | | — |
| 2. On Battery / TXD Output | | DB-9 pins 2,8,9 | DB-9 pin 2 |
| 3. Low Battery Output | | DB-9 pin 1 | |
| 4. Ground | USB shell (drain) | DB-9 shell | DB-9 shell |
| 5. N/C | | | |
| 6. N/C | | | |
| 7. Ground | USB pin 4 (black) | DB-9 pin 5 | DB-9 pin 5 |
| 8. Inverter Shutdown / RXD Input | | DB-9 pins 4,6 | DB-9 pin 3 |
| 9. USB D- | USB pin 2 (white) | | |
| 10. USB D+ | USB pin 3 (green) | | |

*FIG. 4*

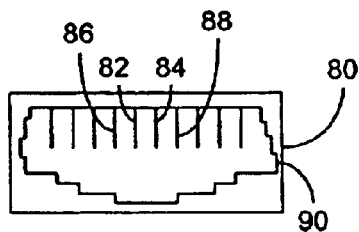

*FIG. 5*

MULTIPURPOSE DATA PORT

This application is a continuation application under 37 C.F.R. 1.53(b) of U.S. Ser. No. 09/813,405, filed Mar. 20, 2001 (U.S. Pat. No. 6,445,088), which is incorporated herein by reference.

FIELD OF THE INVENTION

The present invention is directed generally to uninterruptible power supplies (UPSs) and more specifically to a UPS having a multipurpose data port for communicating between the UPS and a desktop computer, workstation, server or other similar device, wherein the data port can accommodate more than one type of data connection.

BACKGROUND OF THE INVENTION

The use of uninterruptible power supplies having battery back-up systems to provide regulated, uninterrupted power for sensitive and/or critical loads, such as computer systems, and other data processing systems is well known. FIG. 1 shows a typical prior art UPS 10 used to provide regulated uninterrupted power. The UPS 10 includes an input filter/surge protector 12, a transfer switch 14, a controller 16, a battery 18, a battery charger 20 and an inverter 22. The UPS also includes an AC input 24 for coupling to an AC power source (not shown), an AC outlet 26 for coupling to one or more loads (not shown) and an AC surge only outlet 28 for coupling to a monitor and or additional peripheral devices (not shown).

The UPS 10 operates as follows. The filter/surge protector 12 receives input AC power from the AC power source through the AC input 24, filters the input AC power and provides filtered AC power to the transfer switch 14, the battery charger 20 and the surge only outlet 28. The transfer switch 14 receives the AC power from the filter/surge protector 12 and also receives AC power from the inverter 22 provided by battery 18. The controller 16 determines whether the AC power available from the filter/surge protector 12 is within predetermined tolerances, and if so, controls the transfer switch 14 to provide the AC power from the filter/surge protector 12 to the AC outlet 26. If the AC power from the filter/surge protector 12 is not within the predetermined tolerances, which may occur because of "brown out," "high line," "black out," or other conditions, then the controller 16 directs the transfer switch 14 to provide AC power to the AC outlet 26 from the inverter 22.

It is also well known that in addition to backing-up the power supply of computer and other similar systems, UPSs function as surge protectors for preventing problems or damage to a system caused by sudden increases in power (e.g., power surges caused by lightning strikes). While multiple peripherals and datalines to and from a computer system are often necessary, plugging a phone line into a computer system basically doubles the risk of power problems. Add a peripheral device, such as a printer, and the risk of having a power problem triples.

For example, if lightning were to strike a nearby transformer, it might create a surge of power great enough to instantly travel through wiring, network, serial and phone lines. This power surge could then enter an unprotected computer system through the outlet, telephone or network datalines lines. If the surge is great enough, damage could be caused to the circuitry, chips and data of the computer system.

Because damaging power surges can come from fax, modem and network datalines, as well as power supplies, many current UPSs have additional ports where these lines can be connected prior to connection to the system being protected. Many UPS devices also offer dedicated power outlets, such as a surge only outlet 28, for protecting other components of a computer system form sudden power surges, including the monitor and several peripheral devices such as printers, zip drives, scanners and fax machines.

In most of the afore-mentioned prior art UPS systems, operating status information is provided to a user, either locally using, for example, indicating lights or other display system, or remotely by communicating with an external device such as a computer. Also, certain UPS systems provide software that resides on a host computer system and firmware that resides within the UPS that will perform certain functions, such as automatically saving open files and safely shutting down the host computer in case of a sustained power outage. Most of these UPS systems require cabled communication between the UPS and the computer system or external device.

Of the various prior art UPSs that exchange information with a host computer system, most will include one or more cable ports (e.g., DB-9, DB-25, Universal Serial Bus ("USB"), etc.) for supporting different types of cabled communication between the UPS and the computer system. Some examples of prior art communication methods include using a dedicated DB-9 plug type cable for simple signaling, using a dedicated DB-9 or DB-25 plug type cable for serial communication and or using a USB plug cable for higher data transfer rates. Often, because many computers systems, especially those a few years old or older, have a limited number of communication ports, a UPS will employ a number of different ports to support multiple forms of cabled communication. This allows a user to choose the most compatible or appropriate means for connecting their computer system to the UPS.

A drawback with multiple ports on a single UPS is that they require a larger machine footprint than a single port. Therefore, providing room for more than a single port is often at the sacrifice of product size and or alternative component designs such as providing additional electrical outlets.

An additional drawback of using multiple or different communication ports to connect multiple or different types of cables (e.g., USB or serial) is that the additional ports might encourage a user to plug an inappropriate cable into a port. For example, a user might connect a first system into a first port and a second system into a second port on the same UPS, which could overload or damage the UPS.

A further drawback with having several ports is that they require additional printed circuit board space and additional UPS resources.

SUMMARY OF THE INVENTION

The present invention overcomes the problems associated with multiple data ports by providing a multipurpose data port that is capable of supporting a variety of different types of cabled communication means including, but not limited to, USB and RS-232 standards. The single multipurpose data port reduces the footprint needed to support multiple types of communication between the UPS and a computer system or other external device. In addition, the multipurpose data port reduces the likelihood that incompatible devices will be inappropriately connected to the UPS.

In one general aspect, the present invention features a single 10 position RJ-45 jack, wherein the two middle pins are preferably left open, shorted to ground and or connected to each other to prevent interference and damage if a user mistakenly connects a phone line or other similar but inappropriate line to the RJ-45 jack. In addition, the two pins immediately adjacent the middle pins preferably act as grounds to provide an extra level of protection for the UPS and host computer in case a user accidentally plugs a two-line phone into the 10 position RJ-45 jack. By grounding these pins, which are the pins that would normally carry a second phone line, the second phone line would be made equally nondisruptive to the UPS. These and the remaining pins facilitate simple signaling, serial communication and USB communication with a host computer or other similar device.

BRIEF DESCRIPTION OF THE DRAWINGS

For a better understanding of the present invention, reference is made to the drawings which are incorporated herein by reference and in which:

FIG. 4 illustrates a pinout scheme for the multipurpose data port shown in FIG. 3.

FIG. 5 illustrates a typical 10 position RJ-45 jack.

DETAILED DESCRIPTION

Figure 1:
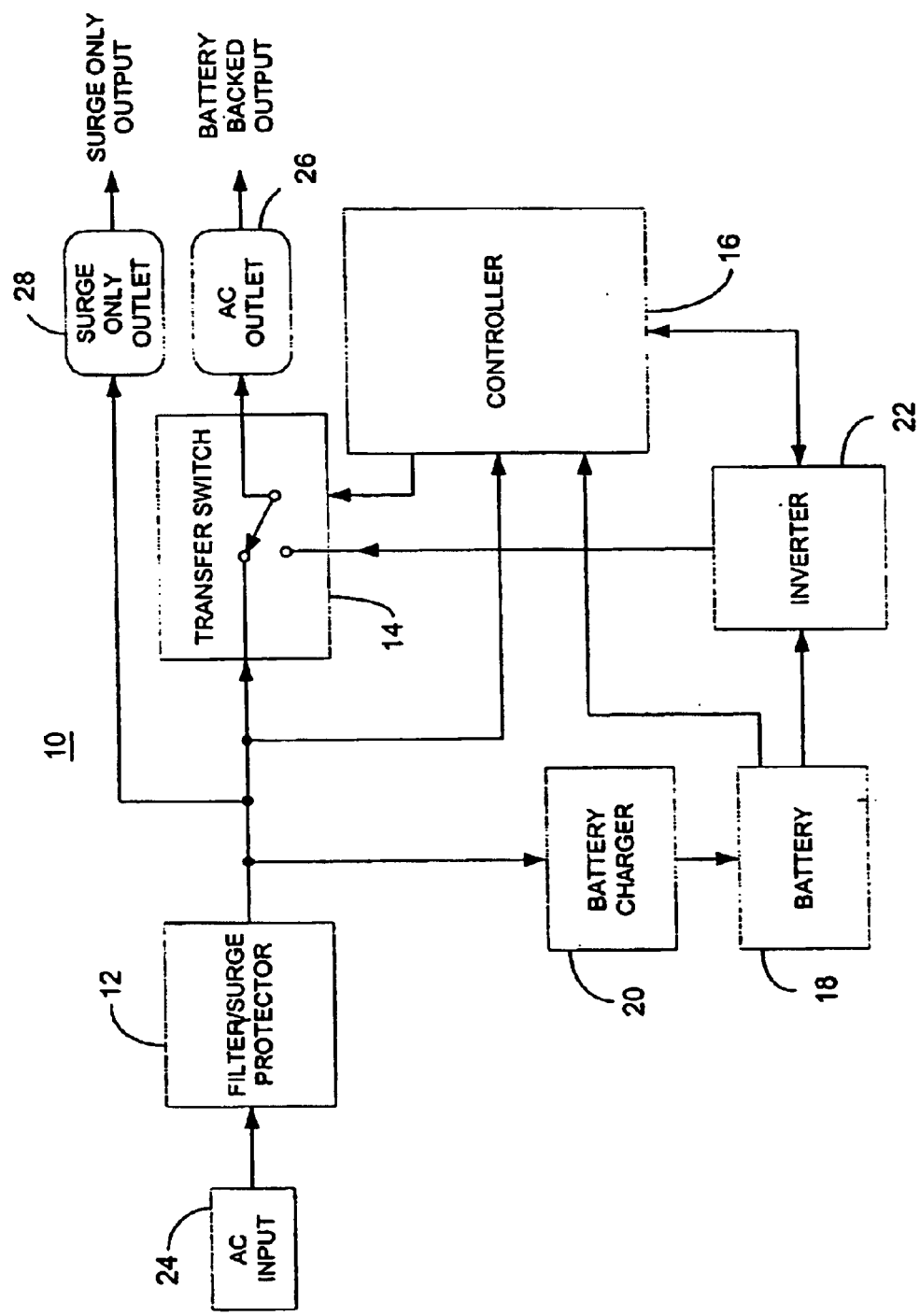
FIG. 1 shows a block diagram of a prior art uninterruptible power supply.
Figure 2:
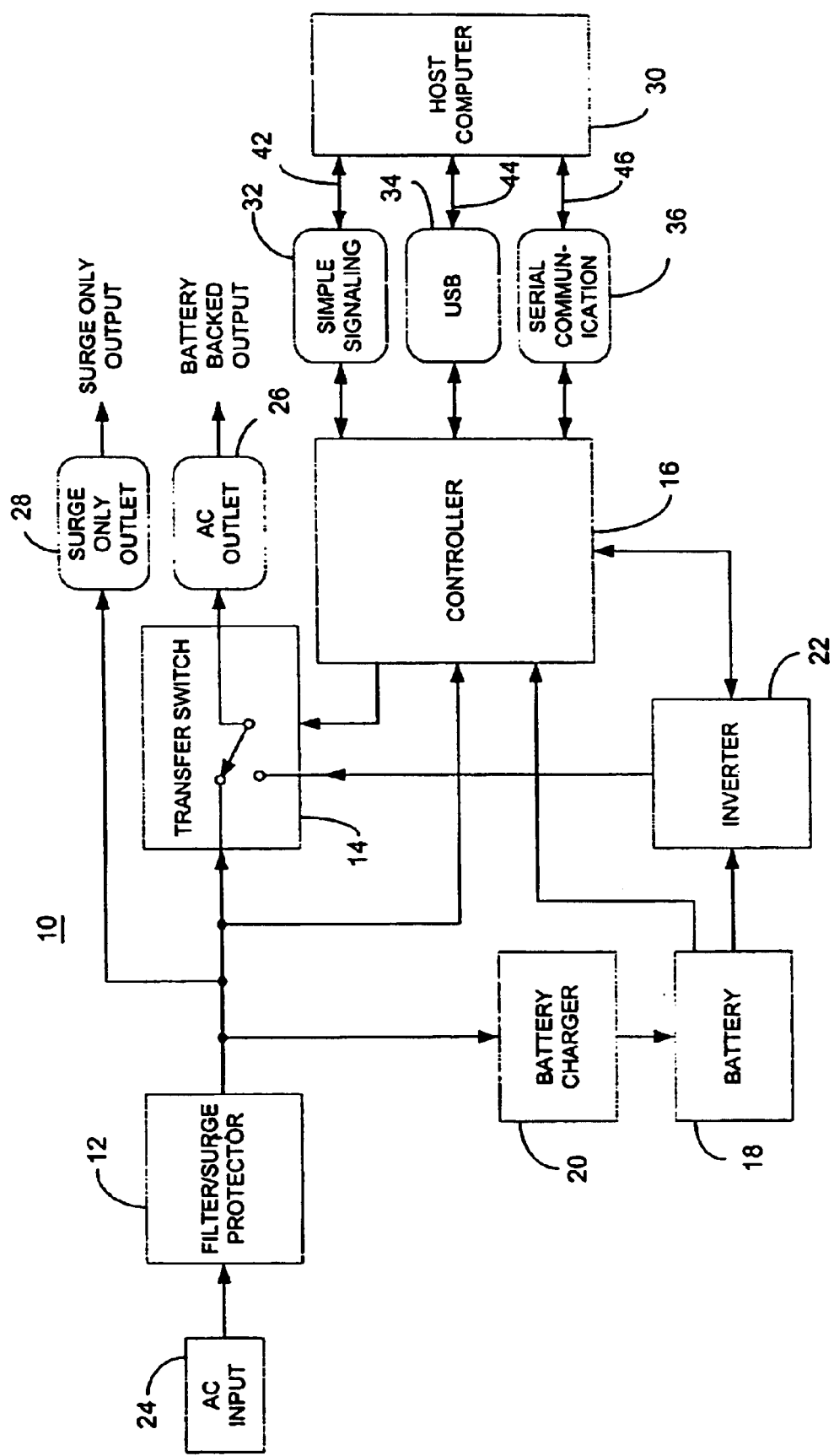
FIG. 2 shows a block diagram of the prior art uninterruptible power supply shown in FIG. 1, having multiple communication ports.

FIG. 2 shows the UPS 10 of FIG. 1 configured to communicate with a host computer 30. To that end, a set of communication ports 32,34,36 is provided. The host computer 30 and the controller 16 are configured to communicate with each other with the controller 16 providing operating status, data saving and other instructions and information to the host computer 30 through a set of cables 42,44,46 connected between communication ports 32,34,36 respectively and the host computer 30. The host computer 30 may also be configured to convey various parameters and commands to the controller 16 via cables 42,44,46. Use of the term "computer" and similar terms, are used broadly and are meant to include microcomputers, networked computer systems, controllers, microprocessors with associated memory, etc.

Each of the communication ports 32,34,36 is shown to provide a different type of data communication between the controller 16 and the host computer 30. For example, the communication port 32 is configured for simple signaling, the communication port 34 is configured for USB communication and the communication port 36 is configured for serial communication.

The type of information communicated between the controller 16 and the host computer 30 may include data saving and unattended shutdown protocols that allow for data saving procedures and safe system shutdown of host computer 30. Other types of information that are also regularly communicated between the controller 16 and the host computer 30 include remaining battery power, battery charging status, low battery alarm, etc. It should be noted that prior art UPS systems having multiple communication ports or other communication port configurations are known and this configuration was chosen merely for descriptive purposes. A plurality of communication ports allows a user to choose the most appropriate means for facilitating communication between the UPS 10 and the host computer 30.

Figure 3:
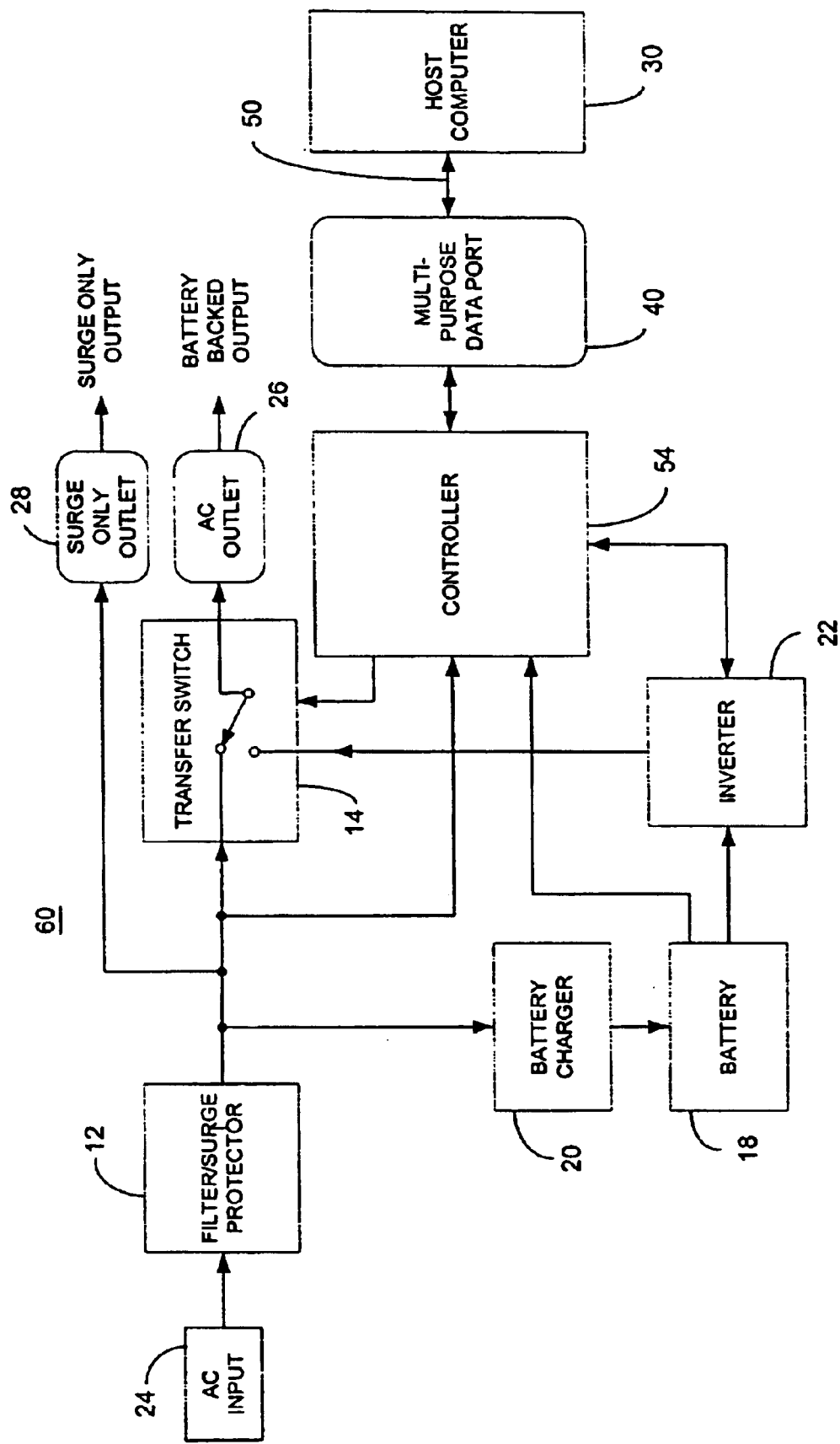
FIG. 3 shows a control block diagram for an uninterruptible power supply having a multipurpose data port in accordance with one embodiment of the present invention.

One embodiment of a multipurpose data port 40, in accordance with the present invention, will now be described with reference to FIG. 3, which shows a schematic diagram of a UPS 60 that is similar to the UPS 10 of FIG. 1. The UPS 60 is configured to communicate with the host computer 30 through the multipurpose data port 40. In the present embodiment, the multipurpose data port 40 is configured to accommodate several types of cable communication methods, such as those depicted in FIG. 2, through a cable 50, operatively connected between the multipurpose communication port 40 and the host computer 30.

In this embodiment, the multipurpose data port 40 includes a 10 position RJ-45 jack 80, as shown in FIG. 5, wherein one or more pins, preferably a pair of middle pins 82,84, are left open, shorted to ground and or connected to each other to prevent interference or damage, for example, if a user mistakenly connects a phone line or other inappropriate line to the multipurpose data port 40. The UPS 60 includes a modified controller 54, firmware and circuitry that allows the UPS 60 to communicate with the host computer 30, over cable 50, all of the information previously communicated over individual cables 42,44,46, as shown in FIG. 2.

In the present embodiment, cable 50 preferably includes an RJ-45 plug on one end for connecting to the 10 position RJ-45 jack 80. Cable 50 may include any of a number of plugs or other connection means on the other end for connecting with host computer 30, including a USB plug, a DB-9 plug, a DB-25 plug, an adapter for connecting to different types of jacks, a multi-headed connection or other compatible connector, depending upon the type of jack or port the cable 50 is connecting to on the host computer 30 or other external device.

An advantage of using the 10 position RJ-45 jack 80 is that the cable 50, which is designed to mate with the 10 position RJ-45 jack 80 (i.e., one fitted with a 10 position RJ-45 plug) would not fit into most other RJ-45 jacks, due to the unique nature of the RJ-45 jack/plug interface, which includes a keyed portion 90. This reduces the likelihood that the host computer 30 would be connected to an inappropriate port on the UPS 60. Additional advantages to using an RJ-45 type jack are that it is readily available in the market, inexpensive and has a relatively small footprint (i.e., when compared to a DB-25 jack) which saves valuable footprint space on the UPS 60 for additional ports or outlets. The position of the keyed portion 90 on the RJ-45 jack 80 as shown is merely for illustration. Various alternative keyed or non-keyed 10 position RJ-45 jacks are contemplated.

In an alternative embodiment of the present invention, cable 50 may be wired directly into the UPS 60. In this embodiment, one end of cable 50 would be hard wired into UPS 60, while the other end would preferably include, as above-described, any of a number of plugs or other connection means for connecting with the host computer 30, including a USB plug, a DB-9 plug, a DB-25 plug, an adapter for connecting to different types of jacks, a multi-headed connection or other compatible connector, depending upon the type of jack or port the cable 50 is connecting to on the host computer 30 or other external device. This embodiment would further reduce the likelihood that an improper connection would be made between the UPS 60 and an external device, because there would be one fewer jack needed on the UPS 60, and only one free end of cable 50.

In yet another embodiment of the present invention, the UPS 60 is configured to provide plug-and-play functionality via the multipurpose data port 40. In this embodiment, the UPS 60 firmware directs the controller 54 to monitor one of the pins of the 10 position RJ-45 jack 80 for signals from the host computer 30, which are directed to the pin via various components in cable 50. This single pin is capable of simultaneously performing at least three tasks, including but not limited, receiving serial data, receiving plug-and-play enumeration requests and receiving simple shut down commands. The plug-and-play functionality, for example, allows the host computer 30 to automatically recognize the UPS 60 and install a proper driver.

Referring now to FIG. 4, a cable pinout chart 70, displays a suggested pinout scheme for the 10 position RJ-45 jack 80 that allows for connecting either a USB cable, a simple signaling cable or a smart serial cable between the multipurpose data port 40 and the host computer 30. Preferably, the firmware and circuitry of the UPS 60 allows the controller 54 to receive data and instructions from the host computer 30 through the multipurpose data port 40.

In a preferred embodiment, a set of pins 86,88 act as grounds. This provides an extra level of protection for the UPS 60 and host computer 30 in case a user accidentally plugs a two-line phone into the 10 position RJ-45 jack 80. As described above, by leaving open, shorting to ground and or connecting the pins 82,84 to each other, the first phone line would be made nondisruptive if were to be accidentally connected to the UPS 60. By grounding pins 86,88, which are the pins that would normally carry the second phone line, the second phone line would be made equally nondisruptive to the UPS 60.

In certain embodiments of the present invention, a multipurpose data port employing a 10 position RJ-45 jack is described and a suggested pinout scheme is illustrated. As understood by one in the art, however, other jacks (e.g., 8 position RJ-45, DB-25, DB-15, DB-9, Mini-DIN, etc.) and other pinout schemes may be used to facilitate connection of the uninterruptible power supply to a plurality of different ports on a computer system.

In addition, certain of the embodiments described herein may also support similar or different types of communication than those described above between the uninterruptible power supply and the computer system. It should also be noted that the multipurpose data port as herein described for use in connection with an uninterruptible power supply may also be employed for facilitating multiple forms of cabled communication between other types of devices.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A multi-protocol port on a first device for connecting the first device to a second device for communication in accordance with one of a plurality of protocols, the multi-protocol port comprising:
   a plurality of communication lines connectable to the second device, including:
      a first plurality of communication lines; and
      a second plurality of communication lines, wherein at least one and not all of the communication lines of the second plurality of communication lines are the same as communication lines of the first plurality of communication lines; and
   a protocol processor sending and receiving signals in accordance with a protocol on one of the first plurality of communication lines and the second plurality of communication lines.

2. The multi-protocol port according to claim 1, wherein the protocol processor sends and receives signals on the first plurality of communication lines in accordance with a first protocol, and wherein the protocol processor sends and receives signals on the second plurality of communication lines in accordance with a second protocol.

3. The multi-protocol port according to claim 2, wherein the protocol processor includes means for selecting one of the first protocol and the second protocol.

4. The multi-protocol port according to claim 3, wherein the means for selecting includes means for receiving a signal on one of the plurality of communication lines identifying one of the first protocol and the second protocol.

5. The multi-protocol port according to claim 1, further comprising:
   a keyed connector containing the plurality of communication lines and accommodating a single connector type.

6. The multi-protocol port according to claim 5, wherein a first connector type corresponds to the first protocol and a second connector type corresponds to the second protocol and wherein the single connector type is not the first connector type nor the second connector type.

7. The multi-protocol port according to claim 5, wherein at least one of the plurality of communication lines is connected to prevent reception of signals sent in accordance with a connector type other than the single connector type.

8. The multi-protocol port according to claim 1, wherein the protocol is one of a USB protocol, a simple signaling protocol, and a RS-232 protocol.

9. A communication system comprising:
   a multi-protocol port, including
      a plurality of communication lines, including:
         a first plurality of communication lines; and
         a second plurality of communication lines, wherein at least one and not all of the communication lines of the second plurality of communication lines are the same as communication lines of the first plurality of communication lines; and
      a protocol processor sending and receiving signals in accordance with a protocol on one of the first plurality of communication lines and the second plurality of communication lines;
      a keyed connector containing the plurality of communication lines and accommodating a single connector type; and
      a connection cable having the single connector type on a first end to connect to the plurality of communication lines in the keyed connector and a second connector type on a second end opposite the first end, the second connector type corresponding to the protocol.

10. The multi-protocol port according to claim 9, wherein the protocol processor sends and receives signals on the first plurality of communication lines in accordance with a first protocol, and wherein the protocol processor sends and receives signals on the second plurality of communication lines in accordance with a second protocol.

11. The multi-protocol port according to claim 10, wherein the protocol processor includes means for selecting one of the first protocol and the second protocol.

12. The multi-protocol port according to claim 11, wherein the means for selecting includes means for receiving a signal on one of the plurality of communication lines identifying one of the first protocol.

13. The multi-protocol port according to claim 9, wherein at least one of the plurality of communication lines is connected to prevent reception of signals sent in accordance with a connector type other than the single connector type.

14. The multi-protocol port according to claim 9, wherein the protocol is one of a USB protocol, a simple signaling protocol, and a RS-232 protocol.

15. A method for operation of a multi-protocol port on a first device having a plurality of communication lines connected between the first device and a second device, the method comprising the steps of:

receiving a protocol signal from the second device on at least one of the plurality of communication lines, the protocol signal identifying a protocol;

sending and receiving second signals to and from the second device on one of a first subset and a second subset of the plurality of communication lines based upon the protocol identified by the protocol signal; wherein the first subset and second subset are not mutually exclusive.

* * * * *